United States Patent [19]

Hagens et al.

[11] Patent Number: 5,215,804
[45] Date of Patent: Jun. 1, 1993

[54] PLANAR SUBSTRATE WITH A REGULARLY TEXTURED SURFACE ON AT LEAST ONE SIDE

[75] Inventors: Hajo Hagens; Hermann Dallmann, both of Wiesbaden, Fed. Rep. of Germany

[73] Assignee: Hoechst Aktiengesellschaft, Frankfurt, Fed. Rep. of Germany

[21] Appl. No.: 785,603

[22] Filed: Oct. 30, 1991

[30] Foreign Application Priority Data

Nov. 2, 1990 [DE] Fed. Rep. of Germany ....... 4034869

[51] Int. Cl.$^5$ .................. B32B 3/00; B29C 49/00
[52] U.S. Cl. .................... 428/156; 428/143;
428/148; 428/149; 428/172; 428/212; 428/213;
428/325; 428/327; 428/328; 428/330; 428/331;
428/423.1; 428/425.9; 428/473.5; 428/474.4;
428/480; 428/521; 264/503; 264/176.1;
264/175; 264/284; 264/291; 264/293
[58] Field of Search ............. 428/156, 105, 141, 167,
428/409, 141, 143, 148, 149, 172, 212, 213, 325,
327, 328, 330, 331, 423.1, 425.9, 473.5, 474.4,
480, 521; 156/196, 209; 264/503, 176.1, 177.2,
175, 291, 284, 293

[56] References Cited

U.S. PATENT DOCUMENTS 3,842,152 4/1972 Witfield ..................... 264/210 R
4,677,188 6/1987 Utsumi ........................ 428/480

FOREIGN PATENT DOCUMENTS 0230633 12/1986 European Pat. Off. .
0229670 1/1987 European Pat. Off. .
0311426 10/1988 European Pat. Off. .
0315478 11/1988 European Pat. Off. .
0399492 5/1990 European Pat. Off. .
8606024 10/1986 PCT Int'l Appl. .
2190020 4/1987 United Kingdom .

OTHER PUBLICATIONS

Patent Abstracts of Japan, vol. 13, No. 105 (C-575) (3435) Mar. 13, 1989 & JP-A-63 278 940 (Toray Industries Inc.) 16. Nov. 1988.
Patent Abstracts of Japan, vol. 12, No. 455 (C-548) (3302) 29, Nov. 1988 & JP-A-63 178 144 (Teijin Ltd.) 22, Jul. 1988.

Primary Examiner—Donald J. Loney
Attorney, Agent, or Firm—R. H. Hammer, III

[57] ABSTRACT

Planar casting with a regularly textured surface on at least one side. A self-supporting planar casting made of polymer material and a process to produce the same are described. The planar casting contains at least one inert additive in an amount in the range of 0.001 to 5% by weight. At least one of it surfaces made from polymer forming the casting is textured by regularly arranged elevations in predominantly longitudinal and transverse direction of largely uniform configuration having a ratio of minimum diameter ($d_{min}$) to maximum diameter ($d_{max}$) in the range of $$0.1 \leq \frac{d_{min}}{d_{max}} \leq 1 \quad \text{and}$$

an average diameter ($d_m$) of $$d_m = \frac{d_{max} + d_{min}}{2}$$

in the range of 10 to 800 μm. The elevations having a height in the range of 0.01 to 15 μm.

21 Claims, 1 Drawing Sheet

PLANAR SUBSTRATE WITH A REGULARLY TEXTURED SURFACE ON AT LEAST ONE SIDE

FIELD OF THE INVENTION

The present invention is directed to a self-supporting polymeric planar substrate having at least one surface which is textured with statistically distributed elevations.

BACKGROUND OF THE INVENTION

Planar substrates, such as films, plates, etc., that are made of polymeric materials often have insufficient slip and friction properties during production or processing. This frequently creates a number of undesirable problems which are attributed mainly to blocking when the substrates touch one another or when a substrate touches a guide member or deflecting element during processing.

Several methods have been proposed to overcome the foregoing problems. These include: mixing inert particles into the polymer material; coating the substrate's surfaces with preparations containing inert particles; or texturing the substrate's surfaces by mechanical, chemical or physical processes. The common goal of each of these methods is the formation of peaks on the substrate's surface. These peaks perform a spacing function and should, therefore, lessen and/or eliminate the blocking of the individual layers of the substrate within stacks. Also, gliding of the substrate over rolls and/or contact with guiding or deflecting elements is improved by the peaks on the substrate's surface.

The foregoing methods have resulted, in part, in clearly improved slippage properties for planar substrates. These improvements have caused a favorable effect on the practical value of those substrates. But, in practice, it became evident that these methods, particularly, when used to manufacture high-grade substrates such as oriented films, caused a number of disadvantages. Moreover, these methods are very costly and have limited applicability for procedural reasons. These procedural reasons are discussed hereinafter.

When inert particles are mixed into the polymeric material forming the planar substrate, the following disadvantages arise: random surface textures (or structures); inadequate abrasion resistance that can cause an increase of the substrate's friction coefficient; considerable cloudiness; poor cutability; interference with the electrical properties; etc. These disadvantages can be traced to: the inert particles; the process of preparing and mixing the polymer and inert particles; and the process by which the polymers are manufactured. Particularly, however, the particles cause the disadvantages because they have: an insufficient strength; an affinity for the polymer; or a strong tendency to agglomerate.

Exemplary of the above-discussed surface texturing by mixing inert particles into the polymer is U.S. Pat. No. 4,725,472. Therein the substrate has peaks surrounded by depressions, the peaks being produced by inert particles. This substrate has several disadvantages. They are: nonuniformity of peaks; peak size is largely dependent upon the size and the amount of inert particles; peak size is also influenced by the form and surface distribution of those particles; and it is not generally feasible to produce these substrates.

In European Application No. 153,853, polyethylene terephthalate substrates are improved by the use of a coating preparation that is applied during the manufacturing process. The problems discussed above, in relationship to inert particles mixed into the polymer, are also encountered in this method. In addition, these coating preparations cause a waste disposal problem because films cannot be recycled. The non-recyclability occurs because the components of the coating preparations are not chemically compatible with the polymer.

In WO-A-87/02173, surface textures are produced by a low temperature plasma treatment. By this method, the surface is given improved slippage, as well as, better adhesive properties for subsequently applied layers. U.S. Pat. No. 4,247,496 discloses substrate surface texturing by means of UV-radiation. Both procedures are costly. Moreover, they are integrated in stretching processes and/or connected with subsequent stretching processes.

DE-A-4,015,658 discloses a process for surface texturing oriented thermoplastic films by the use of rollers having a specific textured surface. However, the disclosed process is free of additives aside from the catalyst precipitates which are created during raw material production. The disclosure makes no reference to any specific catalyst precipitate or to the size of the precipitate or to the grain size distribution of the precipitate.

BRIEF DESCRIPTION OF THE DRAWING

For the purpose of illustrating the invention, there is shown in the drawing a form which is presently preferred; it being understood, however, that this invention is not limited to the precise arrangements and instrumentalities shown.

SUMMARY OF THE INVENTION

Figure 1:
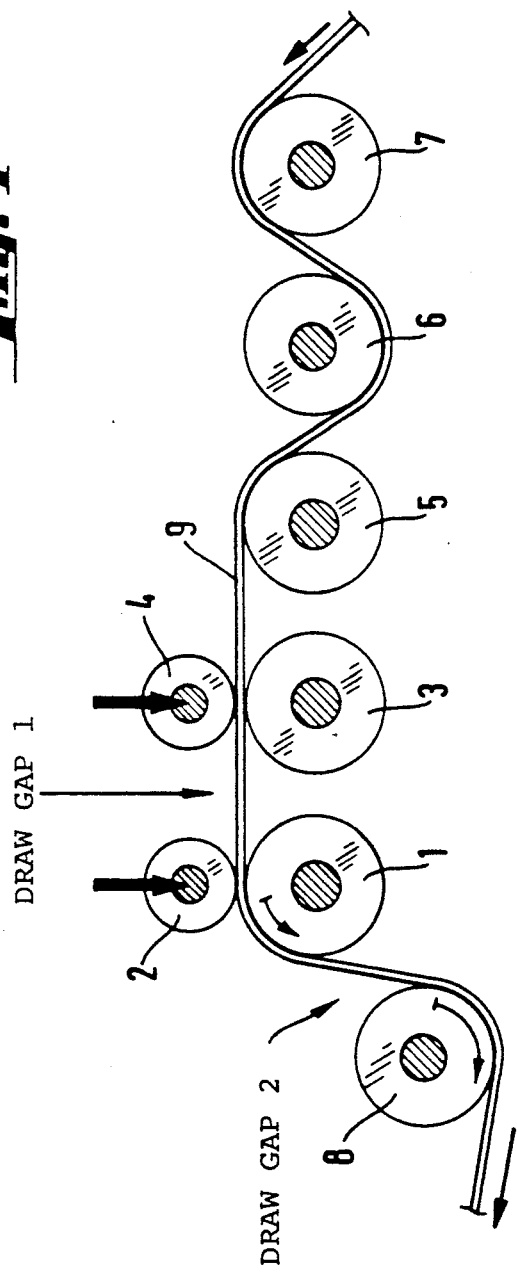
FIG. 1 is a schematic representation of the process according to the present invention.

The object of the present invention is to provide an easily-producible, planar substrate (such as plates, films, etc.) that has at least one slippage-promoting surface. These slippage-promoting features are adjustable in a simple and reproducible manner without affecting any other properties of the self-supporting substrate.

The foregoing slippage-promoting surfaces of the substrate are formed, on at least one surface of the substrate, by a plurality of individual elevations distributed statistically across the surface. These peaks are caused by inert, organic and/or inorganic additives. The "plurality of individual elevations distributed statistically across the surface" can be further described as many interconnected individual structures, where the individual structures possess an extensively uniform configuration. Within the scope of this invention, "extensively uniform configuration" should be understood to mean that the individual elements of the structure are not arranged randomly or in a purely accidental shape next to each other, but rather they should be very similar in their basic geometric dimensions, in terms of shape and position in the planar surface. This similarity is such that in case of an uninitiated observer an impression of regularity is created, brought about by continuously recurring and as identical identifiable elementary cells. The average diameter $d_m$ of said elementary cells, according to this invention, should lie in the range of 10 to 800 $\mu$m, preferably 20 to 400 $\mu$m. The average diameter ($d_m$) is determined as follows:

$$d_m = \frac{d_{max} + d_{min}}{2}$$

where:

$d_{max}$=diameter of the elementary cell at the widest place; and $d_{min}$=diameter of the elementary cell at the narrowest place.

The minimum diameter to maximum diameter ratio of the elementary cell lies in the range of:

$$0.1 \leq \frac{d_{min}}{d_{max}} \leq 1.$$

The basic structure of this invention is formed in such a manner that the deformations of the surface rise 0.01 to 15.0 μm above the lowest areas, preferably in the range of 0.1 to 5.0 μm.

DETAILED DESCRIPTION OF THE INVENTION

The term "polymeric material", as used herein, refers, in principal, to all materials, particularly those which are difficult to manufacture because their surfaces are too smooth, that can be cast into planar substrates. In particular, "polymeric material" refers to those polymers that can be shaped into films or plates. Those polymers can be either naturally occurring polymers or synthetic polymers. Exemplary polymers include: cellulose; cellulose esters; polyvinyl chloride; polystyrene; styrene copolymers, polycarbonate; polymers and copolymers made of olefins such as ethylene, propylene, butylene, methylpentene, etc.; polysulphone; aliphatic and aromatic polyesters; polyimides; polyisobutylene; polymethylmethacrylate; polyphenylene sulfide; polyurethane; polyamide; polyarylether ketone; polyaryletherether ketone; polyarylether sulphones; polyamidimide; and the like. (Compare Ullmanns' *Enzyklopadie der technischen Chemie*, Verlag Chemie, Weinheim, 4th revised and enlarged edition (1976), page 673 et seq.; and *Encyclopedia of Polymer Science and Engineering*, Vol. 7, John Wiley & Sons (1973), page 73 et seq., both of which are incorporated herein by reference.).

The foregoing polymers, insofar as they relate to the instant invention, may be typified as polyesters. Accordingly, the following discussion and examples shall refer to polyester. The instant invention, however, is not so limited.

The term "polyester", as used herein, refers to homo- and copolycondensates; mixtures of different polyesters, as well as blends of polyester with other polyesters and, if necessary, resins.

The production of polyesters can be done according to the ester interchange process, e.g., by means of ester interchange catalysts, for example salts of Zn, Mg, Ca, Mn, Li, or Ge. Alternatively, a direct ester procedure, where antimony compounds are used as polycondensation catalysts and phosphorous compounds as stabilizers, may be used. These polyesters preferably have RSV (reduced specific viscosity) value in the range of 0.60 to 0.90 dl/g.

Examples of polyesters are polycondensates of terephthalic acid, isophthalic acid, or 2,6-naphthalene dicarboxylic acid with glycols having 2 to 10 carbon atoms, such as polyethylene terephthalate, polybutylene terephthalate, poly-1, 4-cyclohexylene-dimethylene terephthalate, polyethylene-2,6-naphthalene dicarboxylate, or polyethylene-p-hydroxy-benzoate.

The polyesters can be composed of up to 30 mol % of comonomer units whereby a variation in the glycol and/or the acid component is possible. Variant acid components for such copolyester may include, among others, adipic acid, glutaric acid, succinic acid, sebacic acid, phthalic acid, isophthalic acid, 5-Na-sulpho isophthalic acid or polyfunctional acids, such as trimellitic acid and others.

The polyester mixtures can be made of polyester-homopolymers, polyester-copolymers, or polyester-homo and copolymers. Examples are blends of polyethylene terephthalate/polybutylene terephthalate, polyethylene terephthalate/polyethylene naphthalate, polyethylene terephthalate/polyethylene isophthalate or polyethylene-isophthalate/5-sodium sulphoisophthalate.

Examples of polymers contained in the polyester are polyolefin-homo or copolymers like polyethylene, polypropylene, poly-4-methylpentene, ethylene-vinylacetate-copolymers, which can be saponified on their part, ionomers, polyamides, polylactones, polycarbonates, polytetrafluoroethylenes, polysulphones and others. These substances can be worked into the polyester during raw material or film production.

The term "resins" refers to natural or synthetic low molecular resins with a softening point in the range of 60° to 180° C. determined according to ASTM E 28. Of the numerous low molecular resins the following are preferred: hydrocarbon resins, especially, the petroleum resins, styrene resins, cyclopentadiene resins and terpene resins.

The good slippage properties of the self-supporting planar substrate are achieved, in the present invention, through a combination of the effects of a regular surface texture applied by means of a special roll and the effect of small amounts of inorganic and/or organic inert additives which are added to the polymers during the raw material or substrate production.

The term "inert additives" includes inorganic and organic inert particles as well as organic, preferably slippage-improving substances which can be present in the casting alone or in combination with each other.

In addition to the inert additives, the self-supporting planar substrate can also contain nucleating agents, antioxidants, thermostabilizers, UV stabilizers, antistatics, flame retardants, dyes, etc.

Examples of inert additives which can be used in combination with each other or with an organic additive are: $SiO_2$ including hydrates; metal oxide particles, e.g. the spherical particles with narrow grain size distribution, described in EP-A-0 236 945 and U.S. Pat. No. 4 567 030 (both of which are incorporated herein by reference); sulfate, phosphate and carbonate of alkaline earth metals; silicate with a $SiO_2$ content>30% by weight; carbon; glass in form of powder and beads; as well as, organic, preferably spherical particles with narrow grain size distribution which can be cross-linked or hardened. Examples are those types described in EP-A-0 125 482 (incorporated herein by reference).

Alternately or in addition catalytic precipitates which were precipitated specifically during the production of certain polymers, e.g., polyesters, can also be used. But preferred are external inert additives which based on the preparation or production, display a substantially uniform form and narrow grain size distribution.

The selection of the inert additives to be used depends upon the requirements made on the substrate to be manufactured. For instance, inert additives with a refractive index matched to the matrix (i.e., polymeric material) are selected for optical high-grade casting, particles containing carbon are preferred for casting with limited light transmittance.

To improve the affinity of the inert additive to the matrix, the inert additives can be surface modified with known methods.

The inert additives may have an average diameter in the range of 0.001 to 5 µm, preferably, of 0.05 to 2.5 µm. The concentrations may be in the range of 0.005 to 5% by weight of the polymer material, for molecular oriented and optionally heat set planar substrates like films, preferably in the range of 0.01 to 1% by weight.

Examples of slippage improving additives are the aliphatic monocarboxylic acids and their derivates set forth in EP-A-0 132 951 (incorporated herein by reference), preferably their esters, as well as, mono- and bisamides and alkaline or alkaline earth metal salts, polysiloxanes, polyether and polyester siloxanes, glycerine esters, etc., which can be present in the substrate alone or in combination with each other like the inert additives. The concentration of the slippage improving organic additives is in the range of 0.005 to 2% by weight.

The invention also relates to a process to produce the above mentioned self-supporting planar substrate whereby the polymer, in dissolved or melted form, is transformed through a pourer or a die into a planar form and brought into contact with at least one roll before or after the removal of the remaining solvent and/or heated above the polymer's glass transition temperature. The roll displays on its surface a number of regularly arranged elevations of largely uniform configuration having a ratio of minimum diameters to maximum diameters in the range of $$0.05 \leq \frac{d_{min}}{d_{max}} \leq 1.$$

The individual textures have a height in the range of 0.5 to 100 µm and a largest expansion in the plane describing the roll surface of less than 300 µm. In general, the structure of the cylinder (roll) should be chosen in such a manner that it leads to the above described basic film structures taking under consideration the subsequent drawing parameters (temperature, draw ratio).

For planar oriented substrates, such as film, the contact with the textured roll can take place in an unstretched state, between the individual stretching steps or before, during or after the heat setting.

The roll may be textured by means of mechanical processes or laser rays. The roll can be coated with ceramic, metal carbides, etc. as described, among other things, in EP-A-0 230 633 (incorporated herein by reference).

By controlling the temperature of the textured roll, the geometry and quality of the surface texture on the self-supporting planar substrate can be regulated specifically. It proved to be advantageous especially for small wrap angles, i.e., very brief contact of the substrate with the textured roll, to press, with a second roll, the self-supporting planar substrate against the heated textured roll.

If a two-sided texturing of the substrate is planned, this second roll can also be textured. Alternately, a second (additional) textured roll coming in contact with the second side of the planar substrate can be used whereby again the substrate can be pressed against this textured roll with an additional roll.

The films produced in the stretch process may show strength in only one direction (monoaxially stretched), balanced mechanical properties in both directions (balanced films) or special stability in transverse and/or longitudinal direction (tensilized or supertensilized films). They can be heat set after the stretch process at temperatures in the range of 150° to 260° C.

The number and sequence of the longitudinal and transverse stretching steps is not specified, but depends upon the end product requirements. The individual stretching processes "longitudinal" and "transverse" can be done in one or several steps. Simultaneous longitudinal and transverse stretching (simultaneous stretching) is also possible.

The optical properties of the film surfaces, i.e. their cloudiness, luster and reflectance can, in contrast to the method of surface structuring, be varied on purpose within broad limits alone with the help of additives, as per this invention, through the choice of the geometry of the structures of the special rolls in combination with the choice of individual processing parameters. For instance, in a multiple stage longitudinal draw and between the individual longitudinal drawing steps concurrently occurring structuring of the film, at a given design of the draw roll, the structuring can be varied as desired by means of a special distribution of the individual drawing factors over the individual longitudinal drawing stages.

In the following, the invention is explained in more detail by means of examples of operation.

The parameters given in the examples were determined in the following manner.

1. RSV-value: The value states the reduced specific viscosity; it was measured according to DIN 53 728, sheet 2.
2. Determination of the surface structures of the films, i.e. geometry of the interconnected elementary cells: The widest and the narrowest diameter ($d_{max}$; $d_{min}$) of an elementary cell was determined by means of differential interference contrast micrographs. The distance between the highest and the lowest point of an elementary cell was determined by means of a Hommel device T20DC, where 50 neighboring individual graphs of the structured film surface were recorded.
3. Cloudiness: The surface cloudiness is obtained from the difference of overall (total) and bulk cloudiness, where the overall cloudiness comes from using ASTM 1003-52 method and the bulk cloudiness is determined after a complete imbedding of the film in immersion oil for microscopy (refractive index $n_d^{20°C}$ of about 1.516) of Merck Co., Darmstadt.
4. $F_5$ longitudinal value: The value states the force related to the diameter of the test specimen necessary for a 5% stretch of the test specimen. Measuring was done according to DIN 53 455.
5. E-modulus: The elasticity modulus was measured according to DIN 53 457. $F_5$-value and E-modulus were determined with a ZWICK equipment Type 1445 where the calibration length was 100 mm, the strip width 15 mm and the takeoff speed 10 mm/min (E-modulus) and/or 100 mm/min. The stated values are based on five individual measurements.
6. Friction: The friction number states the slippage of the film. It was measured according to DIN 53 375.

EXAMPLE OF OPERATION 1

A polyethylene terephthalate melt, comprising exclusively remainders of catalysts and stabilizers but no additional inert additives and having an intrinsic viscosity of 0.65 dl/g, was extruded on a casting drum to form an amorphic film. Next this film was stretched to 3.5 times its size in the draw gap 2 (see FIG. 1) between rolls running with different surface speed. The draw frame used is outlined in FIG. 1. Longitudinal stretching was followed by transverse stretching by a factor of 3.8 at 95° C. Next the biaxially stretched film was heat-set at 205° C. The final film gauge was about 13 μm.

In FIG. 1, roll 1 represents the draw roll where the film reeled off and was then stretched in the draw gap 2 in longitudinal direction. The draw roll temperature was 107° C.

Roll 1 was coated with $Cr_2O_3$. The roll surface was treated with a laser in such a way that about 450 equally large melt cells were formed per square millimeter of oxide coating. The pre-heated unoriented film g was pressed against said draw roll 1 with a contact roll 2 immediately before the longitudinal stretching. Rolls 3, 5, 6, and 7 in FIG. 1 are preheating rolls, roll 4 is an additional contact roll. Roll 8 has the function of a cooling roll.

EXAMPLE OF OPERATION 2

Compared to Example 1 a PET raw material containing 300 ppm spherical monodispersed $SiO_2$ particles as they are described in EP-A-0 236 945 was used.

EXAMPLE OF OPERATION 3

Compared to Example 2 the concentration of the spherical monodispersed $SiO_2$ particles was increased to 500 ppm.

EXAMPLE OF OPERATION 4

Compared to Example 2 a raw material was used containing 300 ppm of spherical monodispersed $SiO_2$ particles and 750 ppm of pentaerithrite-4-stearate.

EXAMPLE OF OPERATION 5

Compared to Example 2 a polymer was used which contained 2000 ppm of highly disperse $SiO_2$ with a primary particle size of 40 nm which was blended into the polyethylene terephthalate via a PET masterbatch containing 8 weight % of $SiO_2$ during the production of polyester. The film extruded from the melt was drawn longitudinally in draw gap 1 at 121° C. by a factor of 1.5, in draw gap 2 at 115° C. by a factor of 2.4, subsequently at 90° C. by a factor of 3.8 transversely and again at 130° C. longitudinally by a factor of 2. Heatsetting of the @ 9 μm thick film took place at 220° C.

EXAMPLE OF OPERATION 6

Compared to Example 1, a polyester polymer was used which contained 300 ppm of Kaolin having an average particle size of 1.8 μm and the amorphous polyester film was drawn in a longitudinal drawing unit corresponding to FIG. 1 by a factor of 3 in draw gap 1 and by a factor of 1.05 in draw gap 2 in the machine direction, where roll 1 (FIG. 1) had been coated with $Cr_2O_3$, and treated with a laser yielding about 100 uniformly large melt cells per square millimeter (on the surface of the roll).

The properties of all films are summarized in the Table. The influence of the inert additives becomes particularly clear when comparing the friction numbers in Examples 1 and 3 which were prepared under analogous process conditions, with the difference that a polymer without inert particles was used in Example 1 and a polymer containing inert particles was used in Example 3. When adding small amounts of inert additives, the friction number and with it also the friction coefficient are clearly reduced, i.e., the slippage of the film surface textured by the laser engraved roll improved substantially. As apparent from the Table through the combination of the texture causing additives and the texture causing engraving rolls the best overall effectiveness is obtained with regard to frictional behavior. The abrasion behavior can be improved further by adding the mentioned additives as apparent in Example 4. The cloudiness of the film is affected only slightly by the addition of the inert additives.

Example 6 makes it clear that by choosing suitable processing parameters very high surface cloudiness at concurrently high transparency can be achieved, where, as shown here, also an anisotropy of the optical properties of the film surface can be adjusted. This is attained through small $d_{min}/d_{max}$ ratios; in the example at hand $d_{min}$ was about 120 μm and $d_{max}$ about 350 μm. From this the average diameter, $d_m$, of an elementary cell calculates to be about 235 μm and $d_{min}/d_{max}$ of about 0.34.

| Example of operation No. | | 1 balanced 12.8 | | 2 balanced 13.7 | | 3 balanced 13.6 | |
| Type | | | | | | | |
| Gauge μm | | | | | | | |
| --- | --- | --- | --- | --- | --- | --- | --- |
| | | longi-tudinal | trans-verse | longi-tudinal | trans-verse | longi-tudinal | trans-verse |
| Mechanical properties | | | | | | | |
| Tension at 3% | N/mm² | 98 | 110 | 101 | 95 | 100 | 110 |
| Tension at 5% | N/mm² | 114 | 127 | 119 | 111 | 116 | 129 |
| Breaking stress | N/mm² | 202 | 261 | 250 | 130 | 258 | 282 |
| Elongation at break | % | 72 | 88 | 81 | 247 | 87 | 86 |
| E-modulus | N/mm² | 4565 | 6073 | 4827 | 5951 | 4696 | 5903 |
| Friction (DIN 53375) | | | | | | | |
| Adhesive friction I/I | | 100 | 100 | 32 | 27 | 27 | 28 |
| Adhesive friction A/A | | 100 | 100 | 30 | 28 | 26 | 25 |
| Sliding friction I/I | | 100 | 100 | 32 | 29 | 26 | 26 |
| Sliding friction A/A | | 100 | 100 | 33 | 29 | 27 | 26 |
| Optical values | | | | | | | |
| Surface cloudiness | % | 0.5 | 0.5 | 1.0 | 1.0 | 1.0 | 1.0 |

-continued

| | | | | | | | |
|---|---|---|---|---|---|---|---|
| Over-all cloudiness (ASTM D2003-52) | % | 1.5 | 2.0 | 2.0 | 2.5 | 2.0 | 2.5 |
| Transparency | % | 87.0 | | 87.0 | | 87.0 | |
| Additive (ppm) | | | | 300 | | 500 | |
| | | | | SiO$_2$ | | SiO$_2$ | |
| | | | | φ0.5 μm | | φ0.5 μm | |

Film properties from examples of operation 1 to 6

| Example of operation No. | | 4 | | 5 | | 6 | |
|---|---|---|---|---|---|---|---|
| Type | | balanced | | supertensilized | | balanced | |
| Gauge μm | | 13.2 | | 9.1 | | 9.0 | |
| | | longi-tudinal | trans-verse | longi-tudinal | trans-verse | longi-tudinal | trans-verse |
| Mechanical properties | | | | | | | |
| Tension at 3% | N/mm$^2$ | 100 | 110 | 157 | 94 | 99 | 107 |
| Tension at 5% | N/mm$^2$ | 113 | 125 | 204 | 107 | 115 | 117 |
| Breaking stress | N/mm$^2$ | 200 | 250 | 437 | 189 | 210 | 259 |
| Elongation at break | % | 87 | 87 | 31 | 130 | 74 | 88 |
| E-modulus | N/mm$^2$ | 4900 | 5800 | 8460 | 4271 | 4611 | 5901 |
| Friction (DIN 53375) | | | | | | | |
| Adhesive friction I/I | | 23 | 24 | 33 | 41 | 44 | 41 |
| Adhesive friction A/A | | 24 | 23 | 49 | 51 | 39 | 38 |
| Sliding friction I/I | | 25 | 23 | 33 | 37 | 37 | 40 |
| Sliding friction A/A | | 23 | 25 | 46 | 45 | 33 | 35 |
| Optical values | | | | | | | |
| Surface cloudiness | % | | | | | 13.7 | 24.1 |
| Over-all cloudiness (ASTM D2003-52) | % | 2.0 | 2.0 | 2.8 | 1.5 | 15.2 | 25.6 |
| Transparency | % | 87.0 | | 87.0 | | 90.0 | |
| Additive (ppm) | | 300 | | 2000 | | 300 | |
| | | SiO$_2$ | | SiO$_2$ | | Kaolin | |
| | | φ0.5 μm | | φ0.04 | | φ1.8 μm | |
| | | plus 750 | | μm | | | |
| | | org. | | | | | |
| Film properties from examples of operation 1 to 6 | | slip agent | | | | | |

We claim:

1. A self-supporting planar substrate comprising:
   a polymeric material containing at least one inert additive in an amount ranging from about 0.001 to about 5% by weight of said polymeric material; and
   at least one surface of the substrate having a plurality of statistically distributed elevations, said elevations being caused by said inert additive, each said elevation having a height in the range of about 0.01 to about 15 μm; said elevations being arranged upon the substrate in the longitudinal and transverse directions of said substrate, and said arrangement being substantially uniform in configuration, said elevations having an average diameter, $d_m$, of $$d_m = \frac{d_{max} + d_{min}}{2}$$

where:
$d_{max}$ = diameter of said elevation at the widest place; and
$d_{min}$ = diameter of said elevation at the narrowest place,
$d_m$ ranging from about 10 to about 800 μm, and the ratio of
$d_{min}$ to $d_{max}$ being in the range of $$0.1 < \frac{d_{min}}{d_{max}} < 1.$$

2. The substrate according to claim 1 wherein said height ranges from about 0.1 to about 5.0 μm.

3. The substrate according to claim 1 wherein $d_m$ ranges from about 20 to about 400 μm.

4. The substrate according to claim 1 wherein said polymeric material is selected from the group consisting of naturally occurring polymers, synthetic polymers and combinations thereof.

5. The substrate according to claim 1 wherein said polymeric material is selected from the group consisting of: cellulose; cellulose ester; polyvinyl chloride; polystyrene; styrene copolymers, polycarbonate; olefin polymers and copolymers made with ethylene, propylene, butylene, methyl pentene; polysulphone; aliphatic and aromatic polyester; polyimide; polyisobutylene; polymethylmethacrylate; polyphenylene sulfide; polyurethane; polyamide; polyarylether ketone; polyaryletherether ketone; polyarylether sulphones; polyamidimide; polyetherimide; and compatible combinations thereof.

6. The substrate according to claim 1 wherein said polymeric material is polyethylene terephthalate.

7. The substrate according to claim 6 being a film.

8. The substrate according to claim 1 wherein said inert additives are selected from the group consisting of inorganic inert particles, organic inert particles, and combinations thereof.

9. The substrate according to claim 1 further comprising an organic slippage improving substance.

10. The substrate according to claim 1 wherein said inert additives are selected from the group consisting of: silicon dioxide; metal oxide particles; sulfates of alkaline earth metals, phosphates of alkaline earth metals; carbonates of alkaline earth metals; silicates having an SiO$_2$ content of >30% by weight; carbon; powdered glass; glass beads; organic particles which can be cross-linked or hardened; and combinations thereof.

11. The substrate according to claim 10 wherein said silicon dioxide and said metal oxide particles have a spherical configuration and have a narrow grain size distribution.

12. The substrate according to claim 10 wherein said organic particles have a narrow grain size distribution.

13. The substrate according to claim 1 wherein said inert additives have a medium diameter ranging from about 0.001 to about 5 $\mu$m.

14. The substrate according to claim 13 wherein said inert additives have an average diameter ranging from about 0.05 to about 2.5 $\mu$m.

15. The substrate according to claim 1 wherein said amount of inert additives ranges from about 0.005 to about 5%.

16. The substrate according to claim 1 wherein said amount of inert additives ranges from about 0.005 to about 1% by weight when the substrate is a molecularly oriented film.

17. A process for producing the substrate in any of the claims 1 through 16 comprising the steps of:
   forming a mixture of the polymeric material and the inert additives; and
   transforming the mixture into the self-supporting planar substrates by contacting the mixture with at least one casting surface; and taking off the finished substrate.

18. The process according to claim 17 further comprising the steps of:
   providing the casting surfaces as at least one roll, the casting surface peaks of said roll ranging in height from about 0.5 to about 100 $\mu$m and the greatest distance between peaks being less than 300 $\mu$m.

19. The process according to claim 17 wherein forming the mixture comprises the step of:
   melting the polymeric material and adding thereto the inert additives.

20. The process according to claim 17 wherein forming the mixture comprises the step of:
   solvating the polymeric material and the inert additives.

21. The process according to claim 17 wherein transforming the mixture comprises the steps of:
   extruding the mixture through a flat slot die onto a cold draw roll;
   biaxially stretching the substrate; and heat setting the substrate, and wherein the contact with the textured roll takes place in an unstretched state, between the individual stretching steps or before, during or after heat setting.

* * * * *